US012600214B2

(12) United States Patent       (10) Patent No.:   US 12,600,214 B2

Ebihara                             (45) Date of Patent:       Apr. 14, 2026

(54) VEHICLE MOTOR

(71) Applicant: ISUZU MOTORS LIMITED, Yokohama (JP)

(72) Inventor: Daiki Ebihara, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 276 days.

(21) Appl. No.: 18/242,491

(22) Filed: Sep. 5, 2023

(65) Prior Publication Data

US 2024/0109406 A1      Apr. 4, 2024

(30) Foreign Application Priority Data

Sep. 30, 2022    (JP) .................................. 2022-158648

(51) Int. Cl.
B60K 1/00               (2006.01)

(52) U.S. Cl.
CPC ...................................... B60K 1/00 (2013.01)

(58) Field of Classification Search
CPC .......... B60K 1/00; B60K 7/0007; H02K 5/04; H02K 7/006
See application file for complete search history.

(56) References Cited

U.S. PATENT DOCUMENTS 11,130,537 B1 * 9/2021 Major, Jr. ................ B60K 5/00
2008/0078603 A1    4/2008 Taji et al.

2018/0281595 A1 * 10/2018 Hiraiwa ............. B62D 25/2027
2019/0023115 A1 * 1/2019 Mackenzie ........... B60K 6/387
2020/0070640 A1    3/2020 Murai
2020/0216138 A1 * 7/2020 Reitinger ............... B62K 25/20
2021/0078379 A1    3/2021 Albl et al.
2021/0231177 A1    7/2021 Schneider
2022/0032787 A1    2/2022 Hebert et al.
2023/0039195 A1    2/2023 Nakamatsu et al.

FOREIGN PATENT DOCUMENTS

CN        109080704 A  * 12/2018  ............. B62D 21/11
DE   102007044411 A1    7/2008
DE   102017220716 A1    6/2018
DE   102019117114 A1    3/2020
DE   112020006522 T5    11/2022
EP        3727912 B1    3/2024
(Continued)

*Primary Examiner* — Joseph J Dallo
(74) *Attorney, Agent, or Firm* — The Roy Gross Law Firm, LLC; Roy D. Gross

(57)                 ABSTRACT

A vehicle motor includes: a motor housing; a rotation shaft disposed to protrude from opposite side surfaces of one end portion of the motor housing so as to be rotatable; and a plurality of mount sections being configured to fix the motor housing to a vehicle frame at opposite lateral sides, in which the plurality of mount sections include a plurality of mounting bosses fixed to the vehicle frame side via a fastening member, the plurality of mounting bosses include first and second mounting bosses disposed to be spaced apart from each other in a vertical direction, and third and fourth mounting bosses disposed to be spaced apart in a left-right direction from an imaginary line connecting the first and the second mounting bosses to each other are disposed to be spaced apart from each other in the vertical direction between the first and the second mounting bosses.

4 Claims, 4 Drawing Sheets

(56) References Cited

FOREIGN PATENT DOCUMENTS

| JP | 2501324 | Y2 | 6/1996 | | |
|----|---------|----|--------|----|----|
| JP | 2016037990 | A | 3/2016 | | |
| JP | 2016176561 | A | 10/2016 | | |
| JP | 2022501554 | A | 1/2022 | | |
| WO | WO-9637376 | A1 * | 11/1996 | ............. | A63H 31/00 |
| WO | WO-2010122735 | A1 * | 10/2010 | ............. | H02K 5/207 |
| WO | WO-2016090306 | A1 * | 6/2016 | ......... | B60B 27/0015 |
| WO | WO-2019071651 | A1 * | 4/2019 | ............. | H02K 5/02 |
| WO | WO-2019154155 | A1 * | 8/2019 | ............. | H02K 9/19 |
| WO | WO-2020031630 | A1 * | 2/2020 | ............. | F04D 29/62 |
| WO | WO-2022197543 | A1 * | 9/2022 | ............. | H02K 5/18 |

* cited by examiner

VEHICLE MOTOR

CROSS REFERENCE TO RELATED APPLICATIONS

This application is entitled to (or claims) the benefit of Japanese Patent Application No. 2022-158648, filed on Sep. 30, 2022, the disclosure of which including the specification, drawings and abstract is incorporated herein by reference in its entirety.

TECHNICAL FIELD

The present disclosure relates to a vehicle motor.

BACKGROUND ART

Recently, demand for electric vehicles (EVs) has been increasing in order to achieve carbon neutrality. As the electric vehicles, for example, such an electric vehicle as that disclosed in Patent Literature (hereinafter, referred to as "PTL") 1 is known in which an electric power train (vehicle motor) called an e-axle that includes a motor, a battery, an inverter, and a transaxle integrated together and has an output shaft for outputting a rotational force is mounted.

An electric vehicle can be manufactured by mounting the vehicle motor on a frame of a vehicle, and it is possible to improve space efficiency, shorten a vehicle development period, and enable mass production of electric vehicles having the same power train.

CITATION LIST

Patent Literature

PTL 1: Japanese Unexamined Patent Application Publication (Translation of PCT Application) No. 2022-501554

SUMMARY OF INVENTION

Technical Problem

When a large vehicle such as a four-wheel drive truck is configured as an electric vehicle, the vehicle motor as the electric power train is mounted on the front wheel side such that a rotation shaft rotationally drives the front wheels of the large vehicle.

In this case, the vehicle motor is disposed between two main frames extending in the front-rear direction of the vehicle, and is mounted in the vehicle such that opposite end portions of the rotation shaft that applies a rotational force to the wheels project in the left-right direction.

In order to firmly attach the vehicle motor, it is necessary to fix the vehicle motor to a mounting bracket extending between the frames and to brackets disposed on opposite lateral sides and fixed respectively to the frames, via mounting bosses disposed on the front end side and on the opposite side surfaces of the vehicle motor.

However, there has been a problem that when the rotation shaft is mounted in the vehicle as the front wheel shaft, the positions of the mounting bosses for fixing the vehicle motor to the brackets on the vehicle frame side interfere with a bracket for supporting a front suspension disposed in the vicinity of the front wheel shaft, and thus the vehicle motor cannot be suitably mounted.

An object of the present disclosure is to provide a vehicle motor that is stably mounted on a vehicle body frame and is suitably driven even when the motor has a rotation shaft.

Solution to Problem

To achieve the above object, the present disclosure employs a configuration including:

a motor housing;

a rotation shaft disposed to protrude from opposite side surfaces of one end portion of the motor housing so as to be rotatable, the rotation shaft being configured to output a rotational force of a rotor within the motor housing; and a plurality of mount sections disposed on opposite side surfaces of another end portion of the motor housing, the plurality of mount sections being configured to fix the motor housing to a vehicle frame at opposite lateral sides, in which:

the plurality of mount sections include a plurality of mounting bosses fixed to the vehicle frame side via a fastening member, the plurality of mounting bosses include first and second mounting bosses disposed to be spaced apart from each other in a vertical direction, and third and fourth mounting bosses disposed to be spaced apart in a left-right direction from an imaginary line connecting the first and the second mounting bosses to each other are disposed to be spaced apart from each other in the vertical direction between the first and the second mounting bosses.

Advantageous Effects of Invention

According to the present disclosure, a vehicle motor can be stably mounted on a vehicle body frame and can be suitably driven even when the vehicle motor has a rotation shaft.

DESCRIPTION OF EMBODIMENTS

Hereinafter, embodiments of the present disclosure will be described in detail with reference to the drawings.

Figure 1:
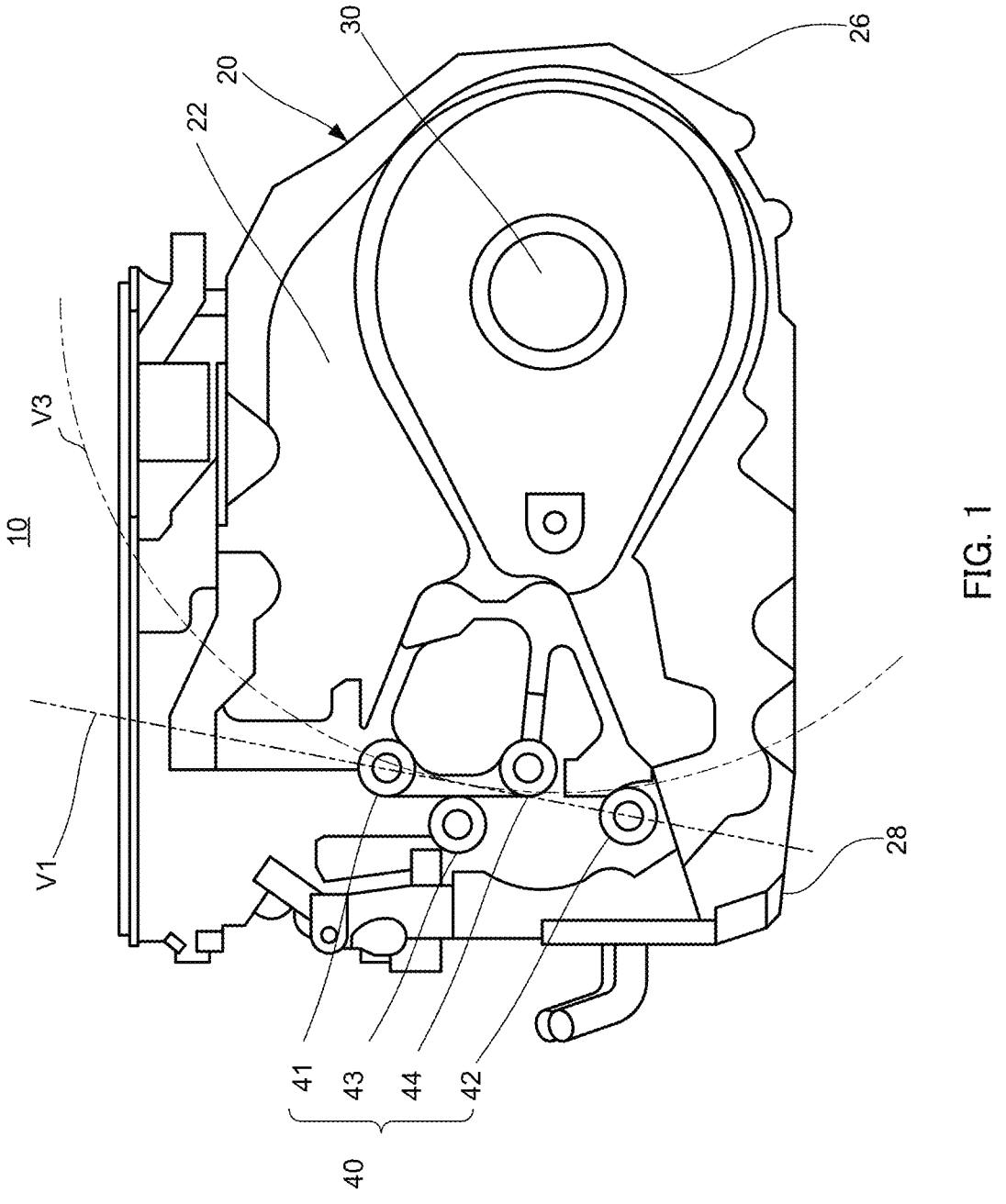
FIG. 1 is a right side view of a vehicle motor according to an embodiment of the present disclosure.
Figure 2:
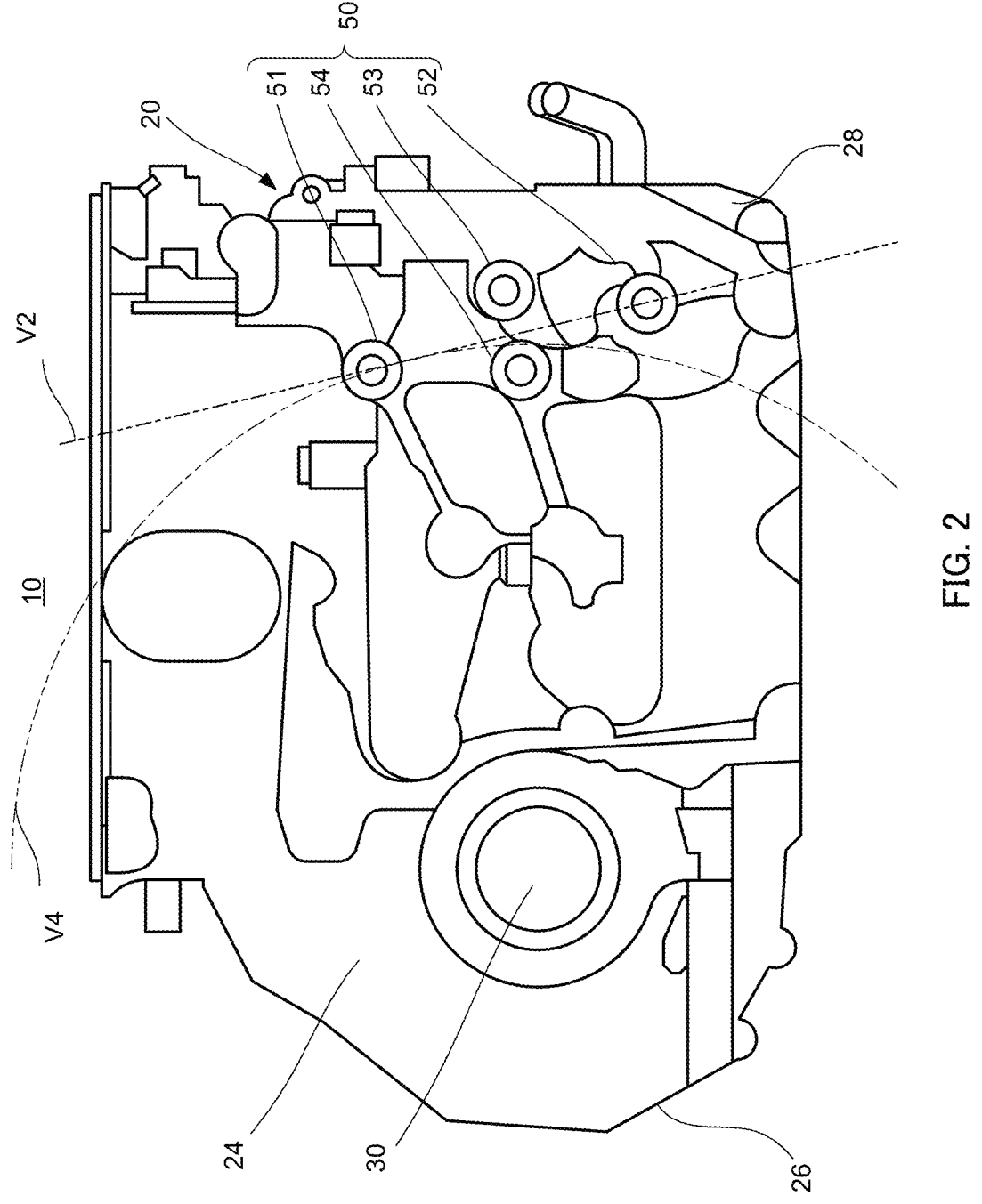
FIG. 2 is a left side view of the vehicle motor according to the embodiment of the present disclosure.
Figure 3:
FIG. 3 is a plan view schematically illustrating a configuration of a principal part of a vehicle in which the vehicle motor according to the embodiment of the present disclosure is mounted.
Figure 3:
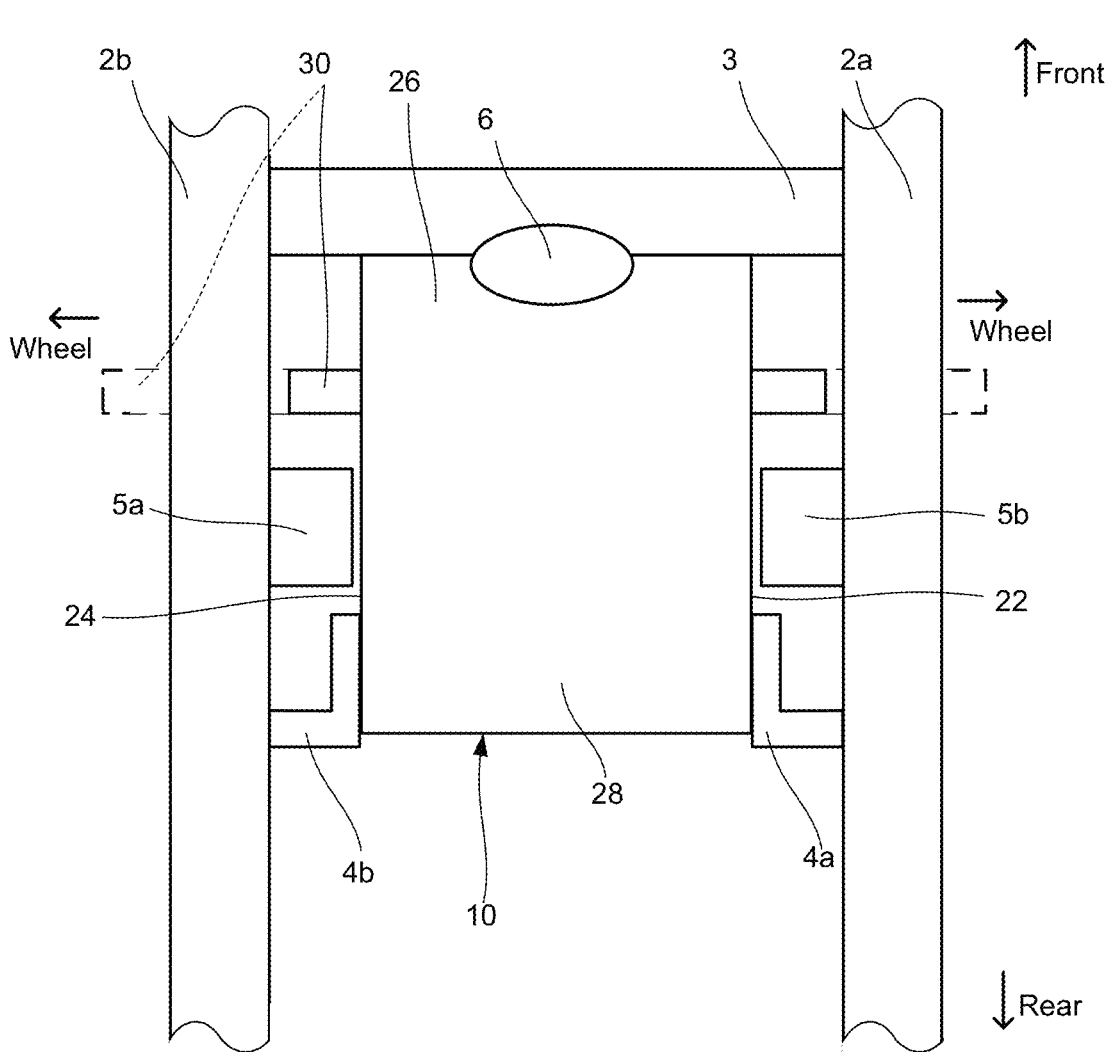

FIG. 1 is a right side view of a vehicle motor according to an embodiment of the present disclosure, FIG. 2 is a left side view of the vehicle motor, and FIG. 3 is a plan view schematically illustrating a configuration of a principal part of a vehicle in which the vehicle motor is mounted. In the present embodiment, the terms, "front," "rear," "left," and "right" refer to the front, rear, left, and right of the vehicle motor mounted in the vehicle.

Vehicle motor 10 includes a stator, a rotor rotatably supported by the stator, and an output shaft that outputs a rotational force of the rotor to the outside, and functions as a driving source of the vehicle in which the vehicle motor is mounted.

Vehicle motor 10 includes motor housing 20, rotation shaft 30 that is the output shaft, and a plurality of mount sections 40 and 50, and is mounted in the vehicle by being fixed to a vehicle frame via mount sections 40 and 50. Note that the vehicle frame denotes an entire frame of the vehicle in which vehicle motor 10 is mounted, and includes, for example, bracket 3, motor brackets 4a and 4b, and the like illustrated in FIG. 3 in addition to main body frames 2a and 2b described later. The vehicle motor may, for example, be an EV traction unit, so-called, an e-axle, in which a motor, an inverter, and a transaxle including a speed reducer are combined as a trinity.

Motor housing 20 includes, inside it, a motor section (not illustrated) including the stator and the rotor (both of which are not illustrated), the inverter that controls the motor section and electric power, and the transaxle that transmits power to the front wheels. Motor housing 20 may further include a battery for supplying electric power to the motor.

The transaxle is disposed inside motor housing 20 on the side of front end portion 26 that is one end portion.

Rotation shaft 30 is disposed at front end portion 26 to protrude from opposite side surface portions 22 and 24 of motor housing 20 in a direction orthogonal to the extending direction of motor housing 20.

Rotation shaft 30 is a part of the transaxle and is also referred to as "output shaft." In motor housing 20, a rotational force of the motor section (not illustrated) is transmitted to rotation shaft 30 via a gear (not illustrated) and the like, and is output to the outside. Rotation shaft 30 is connected to, for example, the front wheels (not illustrated) and transmits the rotational force.

Mount sections 40 and 50 for fixing vehicle motor 10 particularly to motor brackets 4a and 4b (see FIGS. 3 to 5) are disposed on opposite side surface portions 22 and 24 at rear end portion 28 of motor housing 20.

As illustrated in FIG. 1, mount section 40 includes a plurality of mounting bosses (first to fourth mounting bosses) 41 to 44 disposed on the rear end portion 28 side of right side surface portion 22 of motor housing 20.

As illustrated in FIG. 2, mount section 50 includes a plurality of mounting bosses (first to fourth mounting bosses) 51 to 54 disposed on the rear end portion 28 side of left side surface portion 24 of motor housing 20.

Motor brackets 4a and 4b (see FIGS. 3 to 5) are attached to the plurality of mounting bosses 41 to 44 and 51 to 54 via fastening members such as bolts, respectively. Vehicle motor 10 is mounted in the vehicle via motor brackets 4a and 4b.

In the following description, mounting bosses 41 to 44 and 51 to 54 are also referred to as first mounting bosses 41 and 51, second mounting bosses 42 and 52, third mounting bosses 43 and 53, and fourth mounting bosses 44 and 54. Mounting bosses 41 to 44 and 51 to 54 disposed on opposite side surfaces 22 and 24 of motor housing 20 are disposed in a similar manner.

In each of opposite side surface portions 22 and 24 of motor housing 20, first mounting bosses 41 and 51 are spaced apart from second mounting bosses 42 and 52 in the vertical direction.

Third mounting bosses 43 and 53 and fourth mounting bosses 44 and 54 are disposed between first mounting bosses 41 and 51 and second mounting bosses 42 and 52. Third mounting bosses 43 and 53 and fourth mounting bosses 44 and 54 are disposed along imaginary lines V1 and V2 connecting first mounting bosses 41 and 51 to second mounting bosses 42 and 52, and are vertically spaced apart from each other at positions deviated from imaginary lines V1 and V2.

Third mounting bosses 43 and 53 and fourth mounting bosses 44 and 54 are disposed to sandwich imaginary lines V1 and V2 as illustrated in FIGS. 1 and 2.

Each of imaginary lines V1 and V2 may be a tangent line of imaginary circle V3 or V4 centered on rotation shaft 30. Thus, on each of opposite side surface portions (left and right side surface portions) 22 and 24, mounting bosses 41 to 44 and 51 to 54 disposed on imaginary lines V1 and V2 or along imaginary lines V1 and V2 at the positions deviated from imaginary lines V1 and V2 are disposed along the tangent line. It can also be said that mounting bosses 41 to 44 and 51 to 54 are disposed along an arc of an imaginary line.

Each of third mounting boss 53 and fourth mounting boss 54 on right side surface portion 24 illustrated in FIG. 2 is partially disposed on an identical horizontal line.

For example, in the case of large vehicle 1 such as a four-wheel drive truck illustrated in FIG. 3 as the vehicle in which vehicle motor 10 is mounted, vehicle motor 10 is disposed above portions of two main body frames 2a and 2b where the front wheels are disposed, the main body frames extending in the front-rear direction in vehicle 1.

Vehicle motor 10 is mounted between main body frames 2a and 2b such that rotation shaft 30 forms the rotation shaft of the front wheels. Rotation shaft 30 may be disposed below or above main body frames 2a and 2b.

For example, vehicle motor 10 is fixed, via mount section 6 at front end portion 26, to bracket 3 disposed to extend between main body frames 2a and 2b.

In vehicle motor 10, opposite side surface portions 22 and 24 at rear end portion 28 are fixed to main body frames 2a and 2b via motor brackets 4a and 4b attached to mount sections 40 and 50, and vehicle motor 10 is attached to main body frames 2a and 2b.

Vehicle motor 10 is fixed to main body frames 2a and 2b by mount section 6 at front end portion 26, and is fixed by first to fourth mounting bosses 41 to 44 and 51 to 54 at opposite side surface portions 22 and 24.

First to fourth mounting bosses 41 to 44 and 51 to 54 are disposed on opposite side surface portions 22 and 24 in a zigzag shape along the vertical direction as described above, and are fixed to main body frames 2a and 2b (specifically, to motor brackets 4a and 4b).

In addition, in vehicle motor 10, suspension brackets 5a and 5b that support front suspensions disposed close to rotation shaft 30 of the front wheels are disposed to face the center portions of opposite side surface portions 22 and 24 in the front-rear direction.

Effects

Vehicle motor 10 is fixed to main body frames 2a and 2b in rear of the front suspensions by a plurality of mounting bosses including first to fourth mounting bosses 41 to 44 and 51 to 54. Vehicle motor 10 is mounted on main body frames 2a and 2b without being interfered by suspension brackets 5a and 5b.

Further, vehicle motor 10 is fixed to main body frames 2a and 2b by first to fourth mounting bosses 41 to 44 and 51 to 54 at rear end portion 28 that is spaced apart from rotation shaft 30 disposed on the front end portion 26 side in the front-rear direction. Front end portion 26 and rear end portion 28 are disposed at positions sandwiching suspension brackets 5a and 5b.

Figure 4:
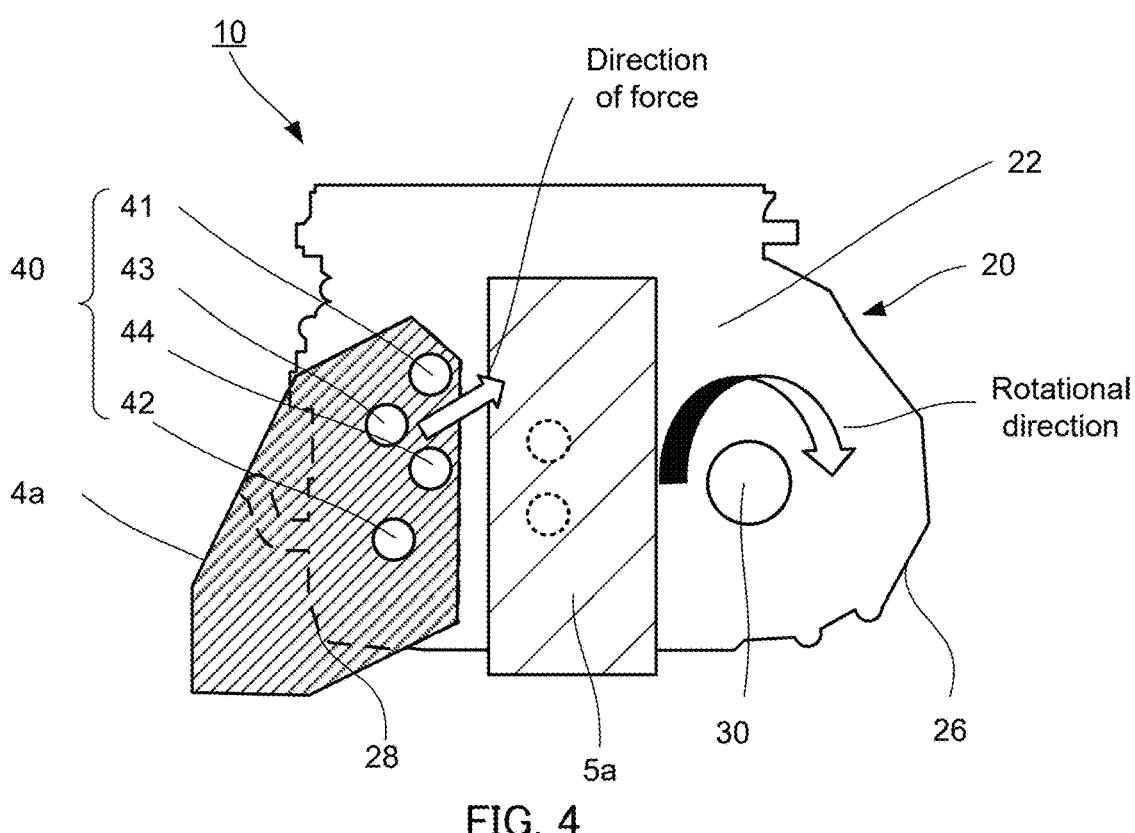
FIG. 4 is a diagram schematically illustrating a load received by mounting bosses on a right side surface of the vehicle motor according to the embodiment of the present disclosure.
Figure 5:
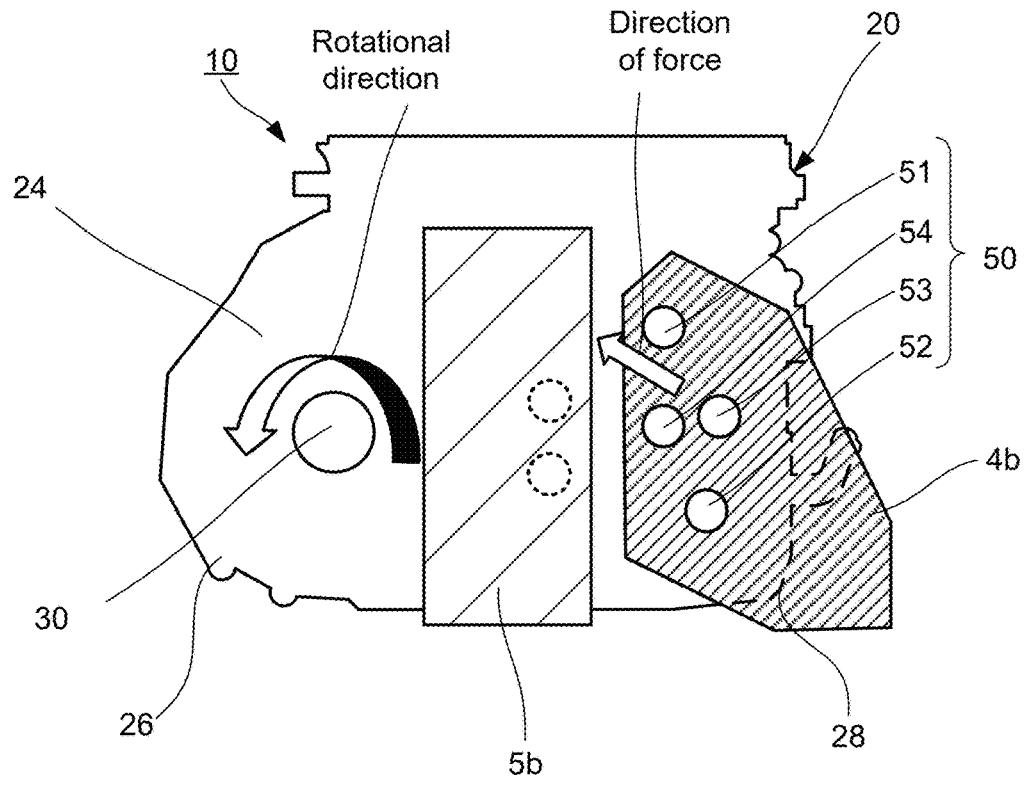
FIG. 5 is a diagram schematically illustrating a load received by mounting bosses on a left side surface of the vehicle motor according to the embodiment of the present disclosure.

Thus, as illustrated in FIGS. 4 and 5, the force generated in the rotational direction when rotation shaft 30 rotates can be received by rear end portion 28 that is distal to the position of suspension brackets 5a and 5b close to rotation shaft 30, and accordingly vibrations and the like during driving can be suitably received.

Further, according to vehicle motor 10, mount section 40 including first to fourth mounting bosses 41 to 44 and mount section 50 including first to fourth mounting bosses 51 to 54 are disposed on opposite side surface portions 22 and 24 of motor housing 20 on the rear end portion 28 side. Each of mount sections 40 and 50 includes first mounting bosses 41 and 51 and second mounting bosses 42 and 52 spaced apart in the vertical direction. In addition, mount sections 40 and 50 include third mounting bosses 43 and 53 and fourth mounting bosses 44 and 54 disposed to be spaced apart from imaginary lines V1 and V2 connecting first mounting bosses 41 and 51 and second mounting bosses 42 and 52 in the left-right direction. Third mounting bosses 43 and 53 and fourth mounting bosses 44 and 54 are vertically spaced apart from each other between first mounting bosses 41 and 51 and second mounting bosses 42 and 52.

First to fourth mounting bosses 41 to 44 and 51 to 54 are fixed to main body frames 2a and 2b at positions along the direction of the force generated around rotation shaft 30 by driving rotation shaft 30. Thus, vehicle motor 10 is stably mounted in the vehicle in a state in which the vehicle motor is unlikely to be affected by vibration caused by driving of rotation shaft 30 or the like.

Further, first to fourth mounting bosses 41 to 44 and 51 to 54 are disposed along the tangent line or the rotational direction of rotation shaft 30, and vehicle motor 10 is fixed to main body frames 2a and 2b at these positions of the mounting bosses. Accordingly, first to fourth mounting bosses 41 to 44 and 51 to 54 are less likely to be affected by vibration or the like caused by the rotation of rotation shaft 30, and vehicle motor 10 can be stably and reliably mounted.

As described above, according to vehicle motor 10, even when the vehicle motor includes rotation shaft 30, the vehicle motor can be stably mounted on the vehicle body frame via motor brackets 4a and 4b on main body frames 2a and 2b and can be suitably driven.

In vehicle motor 10, rotation shaft 30 is described as a drive shaft of the front wheels, but the present invention is not limited thereto, and the rotation shaft may be a drive shaft of the rear wheels. Imaginary lines V1 and V2 may be a vertical line.

The plurality of mounting bosses constituting mount sections 40 and 50 may be any number of mounting bosses including first to fourth mounting bosses 41 to 44 and 51 to 54.

The embodiment disclosed herein is merely an exemplification in every respect and should not be considered as limitative. The scope of the present disclosure is specified by the claims, not by the above-mentioned description. The scope of the present invention is intended to include all modifications in so far as they are within the scope of the appended claims or the equivalents thereof.

INDUSTRIAL APPLICABILITY

The vehicle motor according to the present disclosure has an effect of being stably mounted on a vehicle body frame and of being suitably driven, and is useful when applied to a vehicle driven by electric power, for example, a hybrid vehicle, an electric vehicle, or the like.

REFERENCE SIGNS LIST

1 Vehicle
2a, 2a Main body frame
3 Bracket
4a, 4b Motor bracket
5a, 5b Suspension bracket
6 Mount section
10 Vehicle motor
20 Motor housing
22 Right side surface portion
24 Left side surface portion
26 Front end portion
28 Rear end portion
30 Rotation shaft
40, 50 Mount section
41, 51 First mounting boss
42, 52 Second mounting boss
43, 53 Third mounting boss
44, 54 Fourth mounting boss
V1, V2 Imaginary line
V3, V4 Imaginary circle

The invention claimed is:

1. A vehicle motor, comprising:
a motor housing extending in a front-rear direction of a vehicle;
a rotation shaft disposed to protrude from opposite side surfaces of one end portion of the motor housing in a direction orthogonal to the extending direction of the motor housing, so as to be rotatable, the rotation shaft being configured to output a rotational force of a rotor within the motor housing; and
a plurality of mount sections disposed on opposite side surfaces of another end portion of the motor housing, the opposite side surfaces of the another end portion extending in the front-rear direction of the vehicle, the plurality of mount sections being configured to fix the motor housing to a vehicle frame at each of opposite lateral sides, wherein
the plurality of mount sections include a plurality of mounting bosses fixed to the vehicle frame side via a fastening member in a direction parallel to the rotation shaft, and
the plurality of mounting bosses include
first and second mounting bosses disposed to be spaced apart from each other in a vertical direction on each of the opposite side surfaces of the another end portion, and
third and fourth mounting bosses disposed to be spaced apart in a left-right direction from an imaginary line connecting the first and the second mounting bosses to each other and disposed to be spaced apart from each other in the vertical direction between the first and the second mounting bosses.

2. The vehicle motor according to claim 1, wherein the third mounting boss and the fourth mounting boss are disposed to sandwich the imaginary line.

3. The vehicle motor according to claim 1, wherein each of the third mounting boss and the fourth mounting boss is partially disposed on an identical horizontal line.

4. The vehicle motor according to claim 1, wherein the imaginary line is a tangent of an imaginary circle around the rotation shaft.

\* \* \* \* \*